United States Patent [19]

Swanson

[11] Patent Number: 4,597,127
[45] Date of Patent: Jul. 1, 1986

[54] HYDRAULIC CAR WASH BRUSH

[76] Inventor: Robert A. Swanson, Rte. 9, Box 9, McMinnville, Tenn. 37110

[21] Appl. No.: 685,347

[22] Filed: Dec. 24, 1984

[51] Int. Cl.[4] ............................................. A46B 13/06
[52] U.S. Cl. ...................................... 15/24; 15/97 R; 15/230
[58] Field of Search ...................... 15/23, 24, 97 R, 29

[56] References Cited

U.S. PATENT DOCUMENTS

| 978,461 | 12/1910 | Linegar et al. | 15/24 |
| 1,017,606 | 2/1912 | Tool et al. | 15/24 |
| 2,723,407 | 11/1955 | Bardon | 15/24 |

FOREIGN PATENT DOCUMENTS

| 546106 | 10/1922 | France | 15/24 |
| 147109 | 9/1954 | Sweden | 15/24 |

Primary Examiner—Edward L. Roberts
Attorney, Agent, or Firm—Pitts and Brittian

[57] ABSTRACT

A hydraulically driven rotary brush for cleaning vehicles and the like. This is a rotary brush system wherein the brush rotates about an axis parallel to the item being washed. It has a wand for the attachment to a source of water at one end, and a brush mounted at the further end. Water flowing through the wand is diverted into a channel or channels for the operation of at least one turbine unit connected to the drum supporting the brush. Water exiting from the turbine unit is directed onto the surface being washed to thoroughly flush the same. The drum is provided with means for inserting detergents and/or waxes within the drum, and apertures are provided within the surface of the drum whereby these materials can be fed to the brush whereupon they mix with the water for application to the surface. Provision is made whereby the drum can be readily removed, for example, for the replacement of the bristles or elements of the brush itself.

14 Claims, 11 Drawing Figures

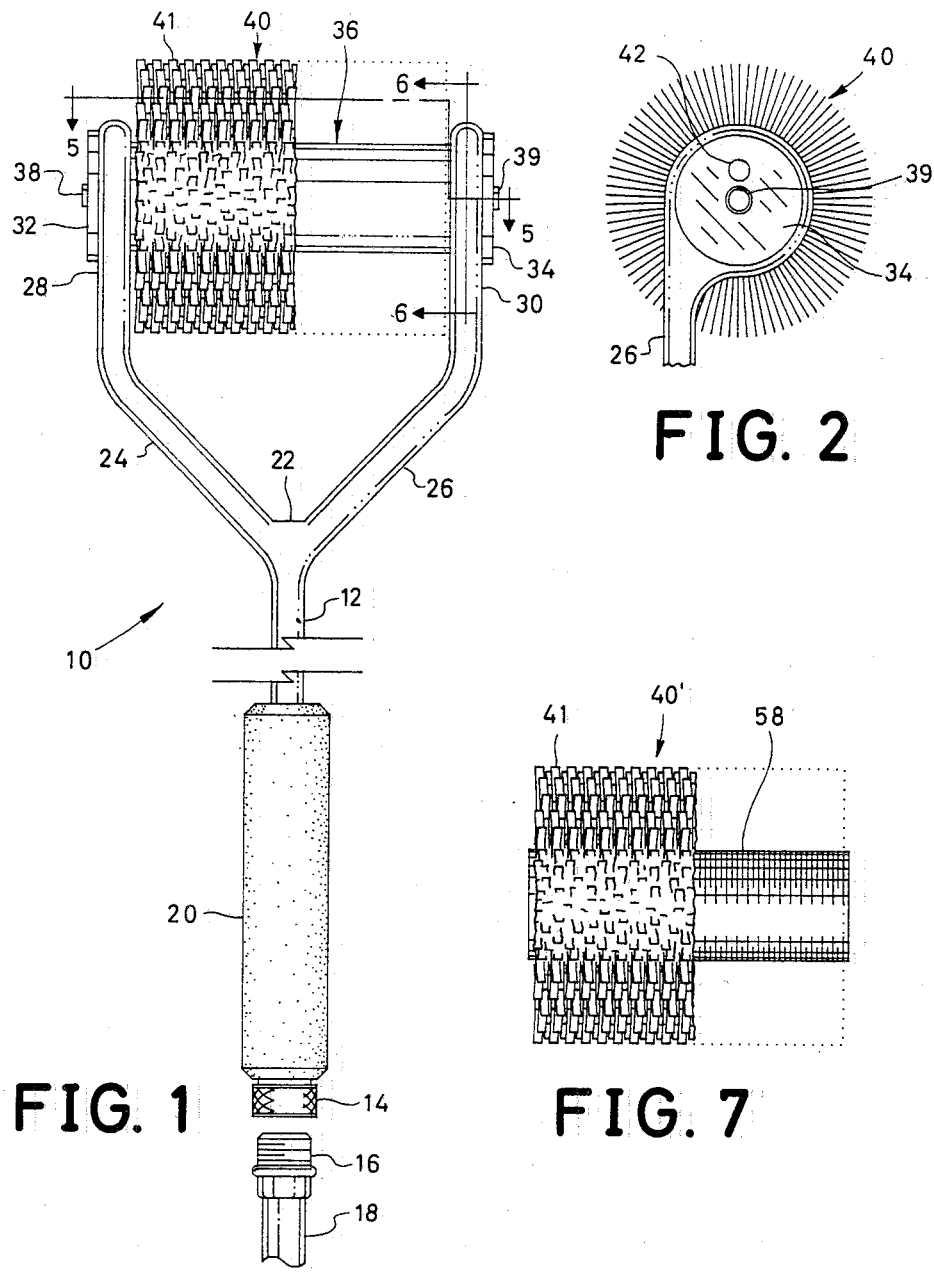

HYDRAULIC CAR WASH BRUSH

TECHNICAL FIELD

This invention relates to rotary washing brushes as utilized for automobiles and the like, and more particularly to a hydraulicly driven brush which rotates about an axis substantially parallel to the surface being washed. The device includes a hollow support cylinder for the brush from which detergent and/or wax are uniformly distributed through the brush to the surface.

BACKGROUND ART

A large variety of rotary washing brushes for the cleaning of automobiles, windows, and many other objects are well known and widely used. Such devices are adapted to be connected to the end of a conventional garden hose, or the like, which supplies the necessary water for the washing operation. Some of these devices include reservoirs for detergent and/or wax external to the brush such that these additives are fed with the water during the washing process. The brushes known in the art utilize a disk type brush operating about an axis generally perpendicular to the surface being washed. These brushes are either driven by gear mechanisms or by some form of turbine which is operated by the water flowing through the device. Typical of the brushes known in the art are shown and described in U.S. Pat. Nos. 3,989,391, issued to R. H. Thorner on Nov. 2, 1976; 3,153,799, issued to W. O. Williams on Oct. 27, 1964; and U.S. Pat. No. 2,918,686, issued to R. L. Swearngin on Dec. 29, 1959. Further typical patents include U.S. Pat. Nos. 2,678,457, issued to M. J. Demo, et al., on May 18, 1954; 2,540,240, issued to W. F. Boyle on Feb. 6, 1951; 1,796,641, issued to J. Zimmerman, et al., on Mar. 17, 1931; 1,649,677, issued to M. Ferrari on Nov. 15, 1927; 1,636,437, issued to A. I. Riedel on July 19, 1927; and U.S. Pat. No. 1,212,967, issued to S. Light, et al., on Jan. 16, 1917. Other very old patents in this field are U.S. Pat. Nos. 919,756; 661,277; and 634,813.

The rotary brushes, as illustrated in this prior art, have certain disadvantages. For example, the entire surface of the brush is usually in contact with the surface being washed. If the brush has any significant size, there is substantial friction between the brush and surface, even though the surface is lubricated with the water, and thus considerable force must be utilized to rotate the brush. Accordingly, the brushes are usually quite small in diameter, and therefore, cover a relatively small area of the surface being washed. Furthermore, a slight exertion of pressure on the brushes causes the stalling thereof, and therefore, the brush loses its effectiveness. In the brushes that are shown to have systems for adding detergent and/or wax to the water, the added auxillary equipment contributes significantly to the cost of the unit as well as the maintenance thereof.

Accordingly, it is one object of the present invention to provide a rotating brush for washing surfaces such as automobiles and the like wherein a relatively small portion of the brush is in contact with the surface at any one time, thereby reducing the force necessary to cause rotation of the brush.

It is another object of the present invention to provide a rotating wash brush wherein detergent and/or wax is added in a very simple manner.

It is still another object of the present invention to provide a hydraulically driven washing brush which rotates on an axis substantially parallel to the surface being washed, whereby surfaces are washed and/or waxed with an inexpensive apparatus.

Other objects and advantages of the present invention will become apparent upon the consideration of the drawings described below and a description of the invention that follows.

DISCLOSURE OF THE INVENTION

In accordance with the present invention, a hollow cylindrical drum is mounted for rotation about an axis parallel to the surface being washed and is provided with a plurality of soft, generally radially extending strips, which form the washing unit per se. Each end of the drum is provided with a plurality of circumferentially spaced turbine impeller blades. This drum is mounted on a central shaft such that each of the impellers fits within housings that distribute incoming water in the form of a jet against the blades causing rotation of the drum. The water from the housing, after being used for the rotation of the drum, exits from the forward edge of the housing to flush the surface being washed at the drum. Openings in the end of the drum, which openings have removable closures, provide for the insertion of detergent and/or water soluable wax within the drum whereupon these materials are permitted to exit through small dispensing holes in the surface of the drum so as to be fed to the brush. All of these components are mounted upon the end of a wand which, in turn, can be releasably attached to a conventional water supply hose.

BRIEF DESCRIPTION OF THE DRAWINGS

FIG. 1 is a top view of a hydraulic car wash brush according to the present invention.

FIG. 2 is an end view of the brush shown in FIG. 1 with the wand portion removed.

FIG. 7 is a cross-sectional view, partially cut away, of one embodiment of the brush of the device of FIG. 1.

BEST MODE FOR CARRYING OUT THE INVENTION

Figure 3:
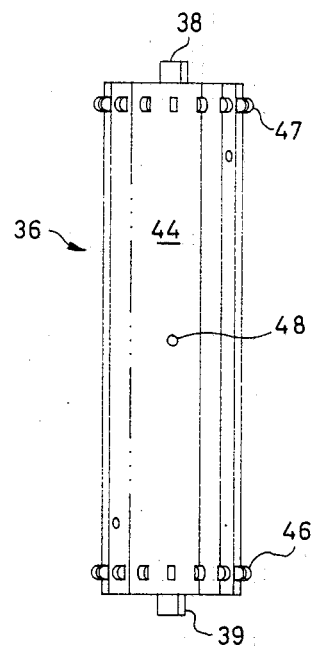
FIG. 3 is a plan view of the drum utilized in the brush in FIG. 1 showing the mounting shafts, the turbine impeller blades, and the dispensing apertures.

Referring now to FIG. 1, shown therein at 10 is a top view of one embodiment of the present invention. This device has a wand 12 which terminates at a far end with a female coupling 14 having internal threads which provide for mating with the threads on a male coupling 16 of a conventional hose 18. The hose and the two couplings are of conventional design. The wand carries a generally cylindrical handle 20 for the convenience of grasp by a user.

The second end of the wand 12 terminates in a Y-connection 22, thus forming two legs 24, 26, that communicate with the interior of the wand. These legs 24, 26 terminate in housings 28, 30 for the purposes described hereinafter. The wand, legs, and housings are all fabricated as a single piece. These housings respectively have external pods 32, 34 for enclosing the end surfaces of a drum unit 36. The drum carries a brush unit 40 formed from a plurality of brush elements 41. The drum is supported and rotates upon shafts 38, 39 which penetrate the pods 32, 34 such that the drum and brush 40 are free to rotate about the axis of the shafts 38, 39.

An end unit view of the brush portion of the device of FIG. 1 is shown in FIG. 2. It may be seen that the shaft 39 is positioned centrally in each of the pods such as 34. Furthermore, it may be seen how the housing 30 generally surrounds the pod for purposes described hereinafter. The pod is provided with an opening 42, which opening can be provided with a removable closure (not shown). Opening 42 provides for the insertion of detergent and/or wax into the interior of the drum of the brush unit. It is to be understood that the opposite pod unit (eg., 32) can contain a similar opening with a removable closure for draining from the interior of the brush or adding material thereto.

A plan view of the central drum 36 is illustrated in FIG. 3. This drum unit consists of a hollow cylindrical shell unit 44 which has appropriate end caps (see FIG. 4) having projected therefrom the shafts 38, 39. Adjacent each end of the shell 44 are a plurality of circumferencially spaced turbine impeller blades 46, 47. It will be understood that if only one turbine unit is utilized, only one set of impeller blades is needed. These impeller blades provide for the rotation of the shell 44 in a manner described hereinafter. The shell is also provided with apertures 48 in the wall thereof whereby detergent and/or wax contained in the shell can exit the shell under centrifugal force to be injected into the brush for their intended purposes.

Figure 4:
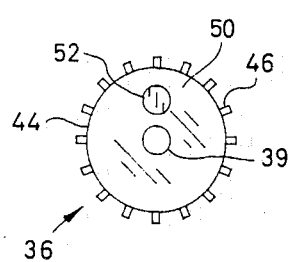
FIG. 4 is a drawing of an end view of the drum of FIG. 3.

An end view of the drum unit 36 is shown in FIG. 4. It may be seen that the turbine blades 46 extend substantially radially from the cylindrical shell 44 in a uniform manner. Shown in this figure also is an alternative opening in the end of a drum closure wall 50 which, when aligned with the opening 42 illustrated in FIG. 2, provides for the insertion or removable of materials into the interior of the shell 44.

Figure 5:
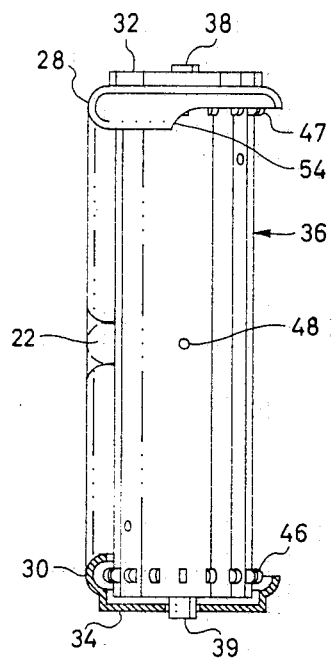
FIG. 5 is a front end view of the brush of FIG. 1, with a portion cut away, taken at 5—5 of FIG. 1.

A partially cut away end view of the present invention is shown in FIG. 5. This view is taken at 5—5 of FIG. 1. Not shown in this figure in order to provide clarity thereto, are the brush elements 41 of FIG. 1 which would be attached to the drum unit 36 in any suitable manner. It may be seen in this figure that the housing 28 has a portion 54 removed along the lower edge thereof. A corresponding portion is removed from the housing 30. This removed portion 54 permits the flow of water that has been used for the turbine drive to exit from the unit for the purposes of throughly flushing the surface against which the brush elements 41 are in contact. Also, it may be seen in this figure how the turbine blades 46 fit within the housing 30 and the ends of the drum unit 36 fit within the pods 32, 34.

Figure 6:
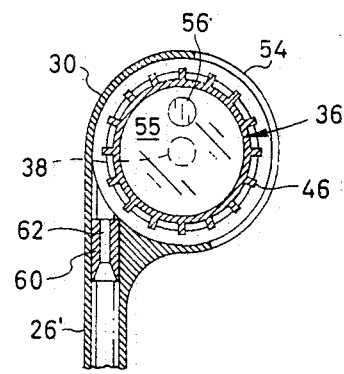
FIG. 6 is a cross-sectional view of one of the housings of the brush of FIG. 1 taken at 6—6 therein.

A cross-sectional view of one of the housings, i.e., housing 30, is shown in FIG. 6. This figure is taken at 6—6 in FIG. 1. It may be seen that the conduit 26 communicates with the volume within housing 30 surrounding the turbine blades 46 such that water flowing through the conduit 26 strikes a portion of the blades bringing about rotation of the drum unit 36. This view shows that the opposite end closure wall 55 of the drum unit 36 is also provided with an opening 56 corresponding in purpose to the opening 52 shown in FIG. 4. When aligned with a corresponding opening in the end pod 32, material can be added to or removed from within the shell 44. It will be understood that as in FIG. 5, the brush elements 41 of the brush 40 are not shown in FIG. 6 for clarity.

In order to increase the efficiency of the turbine units, it may be desirable to increase the velocity of the water and to more exactly direct the same against the impeller blades 46. Shown in FIG. 6 is a means for accomplishing these effects. A jet unit 60 having a small exit passageway 62 is inserted in leg 26 where the same terminates in housing 30. The other leg 24 can have a corresponding jet unit (not shown).

Although a pair of turbine motors are illustrated in the figures, it will be recognized by one versed in the art that for small drums, only one such drive unit may be required. In such circumstance, the opposite end of the drum 36 can be supported as shown or by a separate arm extending from the wand 12 to an appropriate position to receive the shaft 38. In either embodiment the drum can be removed and/or replaced by spreading the housings 28, 30 an amount sufficient to disengage the shafts 38, 39 from the respective pods 32, 34. Such removal will permit the replacement of the brush elements if needed.

The brush elements are typically strips of flexible plastic or the like. They can be directly attached at one end to the drum 36 or to an elastic cylindrical sleeve 58 which closely embraces the drum 36. This later embodiment is illustrated in FIG. 7. This sleeve 58, being flexible, permits insertion onto the drum by passing over the impeller blades 46, 47.

Figure 8:
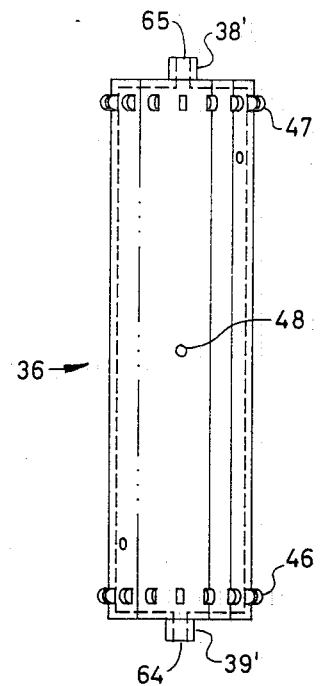
FIG. 8 is a plan view of an alternate embodiment of a drum unit used in the device of FIG. 1.
Figure 9:
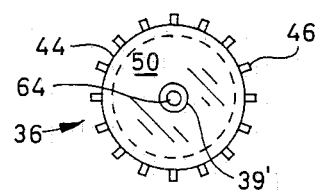
FIG. 9 is an end view of the drum unit of FIG. 8.

An alternative construction for inserting additives to the cavity of the drum 36 is illustrated in FIGS. 8 and 9. The aforementioned opening 42 in the pod 34 and opening 52 in the drum end wall 50 are eliminated in this embodiment. In their place is substituted an opening 64 located on the axis of the shaft 39' which opening communicates with the interior of the drum. If desired, the shaft 38' can also be provided with a corresponding opening 65.

Figure 10:
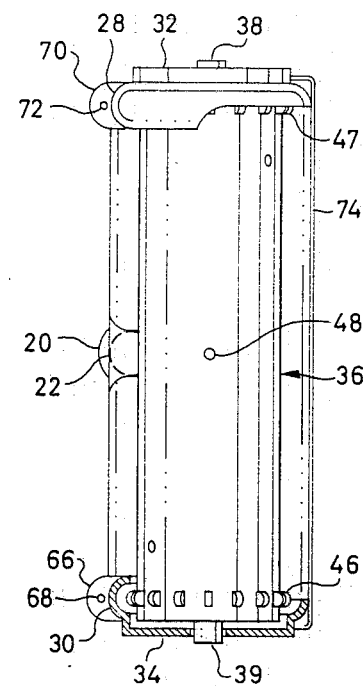
FIG. 10 is a front end view of another embodiment of the invention, with a portion cut away, showing spray nozzles for rinsing purposes.
Figure 11:
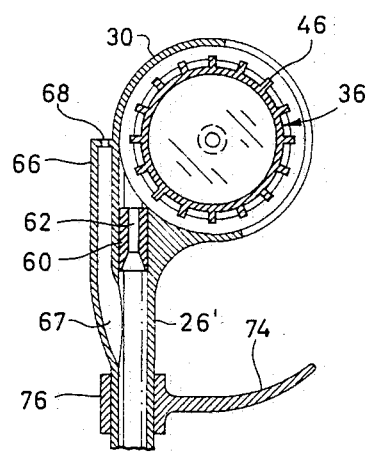
FIG. 11 is a cross-sectional view of one of the turbine units of the device of FIG. 10 showing the spray nozzle of FIG. 10 and a spray deflector or shield.

A further embodiment of the invention includes spray nozzles to rinse the surface after washing. One such embodiment is illustrated in FIGS. 10 and 11. It may be seen in FIG. 11 that an additional water channel 66, having a channel 67, is provided adjacent the end of leg 26. This channel terminates in a slit or small opening 68 which functions as a rinse nozzle. As shown in FIG. 10, another such nozzle unit 70 with opening 72 is provided on the top of leg 28. Preferrably, the spray rinse openings 68, 72, are so positioned that spray from both converge about two feet ahead of the brush in order to provide sufficient water for a complete rinse.

An alternate construction (which is not shown) for spray units employs separate water conduits leading to the end of the handle 20 (see FIG. 1). These additional water conduits would parallel the legs 26, 28 and join on the wand 12, terminating in a valve that could be used to select "wash", "rinse" or "off".

Soft brush elements, as employed in this device, cause considerable splatter. To reduce the amount of such splatter reaching a user of the device, it may be desirable to use a splash shield. One such shield 74 is illustrated in FIG. 11. It is fastened in any suitable manner to the legs 26, 28 of the device. Typically, this can employ split collars 76 or the like. The splash shield typically is fabricated of a semi-flexible material.

For normal operation of the present invention, coupling members 14, 16 are mated such that water flowing through the hose 18 passes into the wand 12. In the embodiment shown in FIG. 1, this water is divided through channels 24, 26 so as to be directed to headers 28, 30 for impingement upon the two sets of turbine blades thereupon causing rotation of the drum 36. The water exits from the turbines, thereby flushing the surface to be washed such that the brush elements 41 during the rotation of the drum 36 brings about the desired washing of a particular surface. Liquid detergent and/or wax contained within the drum 36 is moved by centrifugal action and exits the drum through apertures such as at 48 whereupon the detergent and/or wax mixes with the water to provide the desired action on the surface being washed. Since contact between the brush elements and the surface occurs at a relatively small distance away from the drum 36, any friction from the surface which tends to place a load on the drive turbines is less than at an extended distance. Accordingly, the two drive units will maintain the drum 36 in a rotary motion even when a reasonable degree of force is applied to the surface being washed.

Although not shown in the figures, it may be desirable to include a valve in the hose 18 whereupon the water flowing through the device can be controlled and/or stopped, thus permitting the removal of the wand 12 from the hose 18.

Although a preferred embodiment of the present invention has been shown and described, it will be apparent to those versed in the art that modifications thereto can be made without departing from the scope of the invention. Accordingly, the invention is to be construed as being defined by the elements described, as well as their equivalents, and by the appended claims.

I claim:

1. A hydraulically driven rotary brush assembly for washing the surface of vehicles and the like with water, which comprises:
    a wand element having a coupling unit at a first end for releasable connection to a source of pressurized water, said wand element having a further end terminating in a Y-connection having two legs, each leg having a first end joined to said further end of said wand and a further end, said wand and at least one of said legs having passageways communicating with said first end of said wand, said leg having said passageway terminating at said further end in a turbine housing;
    an elongated hollow cylindrical drum, having a substantially uniform cross section and a central axis, rotatably and releasably mounted between said further ends of said legs for rotation about said drum axis, said legs having sufficient flexibility to permit spreading said further ends thereof to remove said drum;
    a cylindrical brush unit surrounding said drum for rotation with said drum, said brush unit having a plurality of brush elements projecting substantially radially from said drum axis during rotation of said drum;
    a plurality of substantially flat turbine blades circumferentially spaced about, and adjacent to, an end of said drum mounted in said leg having said passageway, each of said turbine blades extending substantially radially from said drum and positioned to be aligned with said passageway in said leg, with said turbine housing partially enclosing said turbine blades;
    whereby water flowing through said wand and said leg having said passageway impinges upon said turbine blades aligned therewith causing concomitant rotation of said drum and said brush unit, with said water being discharged from said turbine housing upon such vehicle during such washing thereof.

2. The rotary brush assembly of claim 1 wherein both of said legs are provided with a passageway communicating with said wand, each leg terminating in a hollow turbine housing, wherein said drum is provided with a plurality of turbine blades circumferentially mounted at each end of said drum within said housings in registry with said passageways in said legs, whereby water flowing through said wand and said legs impinges upon both sets of turbine blades causing concomitant rotation of said drum and said brush unit, with said water being discharged from both of said turbine housings upon such vehicle during such washing thereof.

3. The rotary brush assembly of claim 7 wherein said brush elements of said brush unit are flexible plastic strips, each having one end fastened to a flexible sleeve member, with said sleeve member releasably embracing said drum.

4. The rotary brush assembly of claim 2 wherein said end caps of said drum are each provided with a centrally located, outwardly directed shaft element and wherein said turbine housings are each provided with a circular aperture to rotatably receive one of said shaft elements for mounting of said drum between said turbine housings.

5. The rotary brush assembly of claim 2 wherein both of said legs are provided with a jet at said further ends whereby said water is acclerated in velocity to impinge upon said turbine blades adjacent both ends of said drum.

6. The brush assembly of claim 2 wherein said hollow drum is provided with end caps, said end caps each bring provided a centrally located, outwardly directed shaft element, wherein said turbine housings are each provided with a circular aperture to rotatably receive one of said shaft elements for mounting of said drum between said turbine housings, wherein at least one of said shaft elements is provided with an axial passageway for admitting washing additives and the like into the interior of said drum, and wherein said drum is provided with at least one aperture in the cylindrical wall of said drum for feeding said additives to said brush unit.

7. The rotary brush assembly of claim 1 wherein said hollow drum is provided with end caps, at least one of said end caps provided with an access port for admitting washing additives into the interior of said drum, and wherein said drum is provided with at least one aperture in the cylindrical wall of said drum for feeding said additives to said brush unit.

8. The rotary brush assembly of claim 3 wherein said brush elements of said brush unit are flexible plastic strips, each having one end fastened to a flexible sleeve member, with said sleeve member releasably embracing said drum.

9. The rotary brush assembly of claim 1 wherein said leg having said passageway is provided with a jet at said further end whereby said water is accelerated in velocity to impinge upon said turbine blades on said drum.

10. A hydraulically driven rotary brush assembly for washing vehicles and the like with water, which comprises:
- a wand element having a coupling unit at a first end for attachment to a source of pressurized water, and a further end terminating in a Y-connection of two legs, each leg having a first end joined to said wand, and a further end, said wand and said legs provided with commnicating passageways for the flow of such water therethrough;
- a turbine housing attached to and communicating with corresponding of said further ends of said legs, each of each of said housings provided with a central aperture in a side wall;
- a hollow cylindrical drum having opposite end walls each provided with an upstanding shaft stub for rotatable engagement with said apertures in said turbine housings, at least one of said end walls being provided with an access port for admitting washing additives to the interior of said drum, said drum being provided with apertures in the cylindrical wall thereof for feeding said additives out of said drum;
- a plurality of turbine blades mounted circumferentially about said drum adjacent both ends of said drum to be received within corresponding of said turbine housings and aligned with said further ends of said legs; and
- a brush unit surrounding said drum for rotation with said drum, said brush unit having a plurality of flexible plastic brush elements projecting substantially radially from said drum during rotation of said drum whereby such water flowing through said wand and said legs impinges upon said turbine blades within said turbine housings causing concomitent rotation of said drum and said brush unit, with such water discharging from said turbine housings flushing such surface of such vehicles.

11. The brush assembly of claim 10, further comprising a jet unit mounted within said passageways of said legs at said further ends whereby such water flowing through said legs is accelerated and directed against said turbine blades.

12. The brush assembly of claim 10 wherein one end of each of said brush elements is attached to a flexible cylindrical sleeve, and said sleeve releasably embraces said cylindrical wall of said drum.

13. The brush assembly of claim 10 further comprising a splash shield attached to, and depending from, said legs and oriented to be substantially parallel to said drum.

14. The brush assembly of claim 10 further comprising a rinse nozzle positioned at each of said turbine housings for directing a water spray forward of said brush unit.

* * * * *